(12) United States Patent (10) Patent No.: US 9,027,093 B2
Hinton et al. (45) Date of Patent: May 5, 2015

(54) BUSINESS PROCESS ENABLEMENT FOR IDENTITY MANAGEMENT

(75) Inventors: Heather Maria Hinton, Austin, TX (US); Venkat Raghavan, Austin, TX (US); Sridhar R. Muppidi, Austin, TX (US); Casey M. Plunkett, Green Bay, WI (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/649,496

(22) Filed: Dec. 30, 2009

(65) Prior Publication Data

US 2011/0162055 A1 Jun. 30, 2011

(51) Int. Cl.
*H04L 29/06* (2006.01)
*G06F 9/54* (2006.01)
*G06F 9/46* (2006.01)

(52) U.S. Cl.
CPC .............. *G06F 9/541* (2013.01); *G06F 9/468* (2013.01)

(58) Field of Classification Search
USPC .............................................. 713/164; 726/5
See application file for complete search history.

(56) References Cited

U.S. PATENT DOCUMENTS

| | | | | |
|---|---|---|---|---|
| 6,067,623 | A * | 5/2000 | Blakley et al. | 726/5 |
| 7,191,467 | B1 * | 3/2007 | Dujari et al. | 726/5 |
| 7,418,401 | B2 * | 8/2008 | Bogasky et al. | 705/12 |
| 7,549,049 | B2 * | 6/2009 | Bogasky et al. | 713/173 |
| 7,565,540 | B2 * | 7/2009 | Bogasky et al. | 713/173 |
| 7,698,735 | B2 * | 4/2010 | Dujari et al. | 726/8 |
| 8,296,828 | B2 * | 10/2012 | Dalzell et al. | 726/6 |
| 2002/0062451 | A1 * | 5/2002 | Scheidt et al. | 713/201 |
| 2005/0005259 | A1 * | 1/2005 | Avery et al. | 717/103 |
| 2005/0044413 | A1 * | 2/2005 | Elms et al. | 713/201 |
| 2006/0031116 | A1 * | 2/2006 | Bogasky et al. | 705/12 |
| 2006/0035713 | A1 * | 2/2006 | Cockerille et al. | 463/42 |
| 2006/0041514 | A1 * | 2/2006 | Bogasky et al. | 705/64 |
| 2006/0041516 | A1 * | 2/2006 | Bogasky et al. | 705/76 |
| 2006/0069995 | A1 * | 3/2006 | Thompson et al. | 715/700 |
| 2006/0075224 | A1 * | 4/2006 | Tao | 713/164 |
| 2006/0167714 | A1 * | 7/2006 | Birch et al. | 705/1 |

(Continued)

OTHER PUBLICATIONS

Mont et al, "Active digital credentials: dynamic provision of up-to-data identity information," InfraSec 2002.

Mjolsnes et al, "On-Line E-Wallet System with Decentralized Credential Keepers," Mobile Networks and Applications 8, pp. 87-93 (2003).

(Continued)

*Primary Examiner* — Bradley Holder
(74) *Attorney, Agent, or Firm* — Jeffrey S. LaBaw; David H. Judson (57) ABSTRACT

A method, system and computer program for business process automation facilitates transforming a user's identity/credentials as part of the enablement of transaction fulfillment, e.g., within a SOA environment. In one embodiment, identity and attribute information is added to one or more business process models that each represents a sub-transaction within an overall transaction fulfillment business process flow. As the business model is mapped to an execution environment, the identity and attribute information in the model is used to configure appropriate tooling to define the identity/attribute transformation required to complete the particular portion of the transaction represented by the model. In a representative implementation, the business process models conform to BPEL4WS, and one or more of these models are extended with identity mapping information such that, during transaction fulfillment, local identity mapping transformations provide the identity/credential propagation required to support the business process.

18 Claims, 5 Drawing Sheets

(56) References Cited

U.S. PATENT DOCUMENTS

| | | | |
|---|---|---|---|
| 2006/0185021 A1* | 8/2006 | Dujari et al. | 726/27 |
| 2006/0235796 A1 | 10/2006 | Johnson et al. | |
| 2010/0154041 A1* | 6/2010 | Dalzell et al. | 726/6 |
| 2010/0306668 A1* | 12/2010 | Williams et al. | 715/741 |
| 2011/0041171 A1* | 2/2011 | Burch et al. | 726/7 |

OTHER PUBLICATIONS

Bhargav-Spantzel et al, "User Centricity: A Taxonomy and Open Issues," DIM '06, Nov. 3, 2006.

Venugopal et al, "A Taxonomy of Data Grids for Distributed Data Sharing, Management and Processing," ACM 2006.

PCT/EP2010/069819, International Search Report and Written Opinion, Jun. 8, 2011.

* cited by examiner

BUSINESS PROCESS ENABLEMENT FOR IDENTITY MANAGEMENT

BACKGROUND OF THE INVENTION

1. Technical Field

This disclosure relates generally to business process automation functionality and, in particular, to techniques for extending such automation to include identity management information.

2. Background of the Related Art

Increasingly, executives are placing service-oriented architecture (SOA) and Web services on their corporate agendas. An SOA is an application framework that supports componentized business processes, freeing functions and data from their applications so that they can be accessed by and extended to whomever a company chooses. A business process can be defined as a set of interrelated tasks linked to an activity that spans functional boundaries. Business processes have starting points and ending points, and they are repeatable. Useful business processes make and save money for an enterprise. Web services is a collection of standard technologies that, when applied to an SOA, removes the need for custom coding, resulting in reduced development costs and increased business flexibility and responsiveness. These technologies help businesses increase revenue and efficiency by enabling them to become more flexible and responsive.

Today Web services can communicate with each other, advertise themselves, and be discovered and invoked using industry-wide specifications. To link these services together in a business process, the Business Process Execution Language for Web Services (BPEL4WS) specification may be used. BPEL4WS facilitates creation of complex processes by creating and wiring together different activities that can, for example, perform Web services invocations, manipulate data, throw faults, or terminate a process. These activities may be nested within structured activities that define how they may be run, such as in sequence, or in parallel, or depending on certain conditions. In addition to being an implementation language, BPEL4WS can be used to describe the interfaces of business processes using a notion of abstract processes.

As an enterprise moves to a SOA environment, however, often it is the case that assumptions that have been made about the environment, request flow, and user access to resources, no longer hold. For example, internal users (such as enterprise employees) are often used to (but not necessarily pleased with) the multiple authentications required to access all of the resources necessary to complete a given task. As the enterprise opens up to its partners its internal applications or business processes, it is undesirable for the "partner-users" to have to go through this repeated authentication. To simplify this process, single sign-on (SSO) techniques can be used to map a partner user to a locally-known identifier value that represents the user's identity at the SSO point. As the partner-user invokes more complex business processes, however, there is no easy way to know how, where or when to map or transform the user's identifier into a locally-valid identifier that is applicable to that point in the overall business process. In particular, there is no process or policy-based based means of transforming a user's identity (or, more specifically, credentials) as part of enabling transaction fulfillment within a SOA environment. This information is required, however, to ensure that a request has the appropriate processing (including access control decisions based on the request and the requestor's identity and attributes) applied.

Identity management is a main aspect of enterprise security, and it typically comprises identity authentication, resource access authorization, and event logging for auditing compliance. Identity management systems and techniques are well-developed in the art.

BRIEF SUMMARY

A method, system and computer program for business process automation facilitates transforming a user's identity (or, more generally, a credential) as part of the enablement of transaction fulfillment, e.g., within a SOA environment. In one embodiment, identity and attribute information is added to one or more business process models that each represents a sub-transaction within an overall transaction fulfillment business process flow. As the business model is mapped to an execution environment, the identity and attribute information in the model is used to configure appropriate tooling to define the identity/attribute transformation required to complete the particular portion of the transaction represented by the model. In a representative implementation, the business process models conform to BPEL4WS, and one or more of these models are extended with identity mapping information such that, during transaction fulfillment, local identity mapping transformations provide the identity propagation required to support the overall business process.

According to an embodiment, a machine-implemented method for business process automation begins by extending a business process model to include credential information, wherein the business process model represents a sub-transaction in a transaction and the identity information is implementation-independent. The business process model may conform to BPEL and be specified using BPEL4WS, and the overall transaction may be implemented across a SOA application framework. During the transaction, and as the business process model is mapped to a given local execution environment, the credential information is refined into a format that can be acted upon by an application invoked to perform the sub-transaction. The refined credential information is then used to perform the sub-transaction. This approach provides for the easy identification of the attributes that are available at the "edge" of a process, which facilitate business process enablement even in loosely-coupled environments, such as a federation. Such rich identity transformations make it easier to expose robust Web services (e.g., enabling direct database queries) in this environment.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

The techniques described herein presume familiarity with Services Oriented Architecture (SOA), Web services, and Business Process Existing Language (BPEL). As noted, an SOA is an application framework that supports componentized business processes, freeing functions and data from their applications so that they can be accessed by and extended to whomever a company chooses. In addition, the techniques described relate generally to identity management, which typically comprises several primary aspects: the authentication of identities, the authorization of resource access, and the logging of events for the purposes of ensuring compliance with auditing requirements. Identity management products and technologies are well-known in the prior art. One such product is IBM® Tivoli Federated Identity Manager, which provides a stand-alone identity service tool for establishing identity awareness in SOA and Web services environments to reduce administrative costs, establish trust and facilitate compliance by managing, mapping and propagating user identities.

Figure 1:
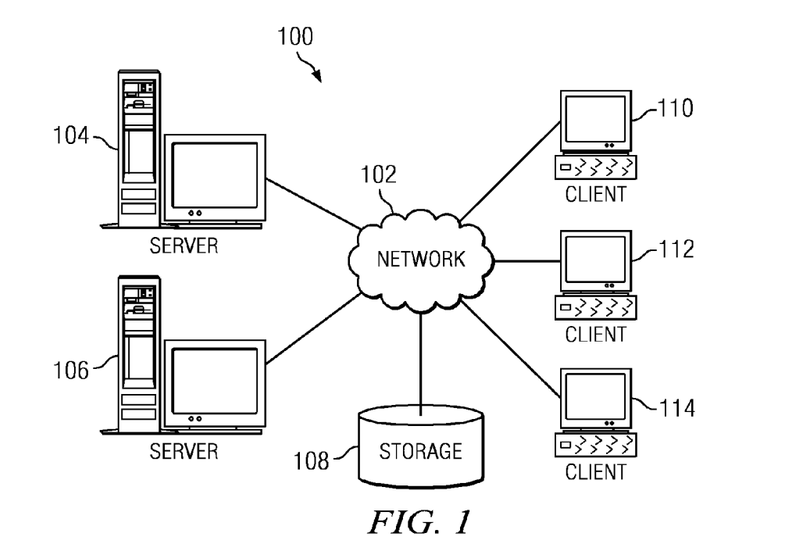
FIG. 1 depicts an exemplary block diagram of a distributed data processing environment in which exemplary aspects of the illustrative embodiments may be implemented.
Figure 2:
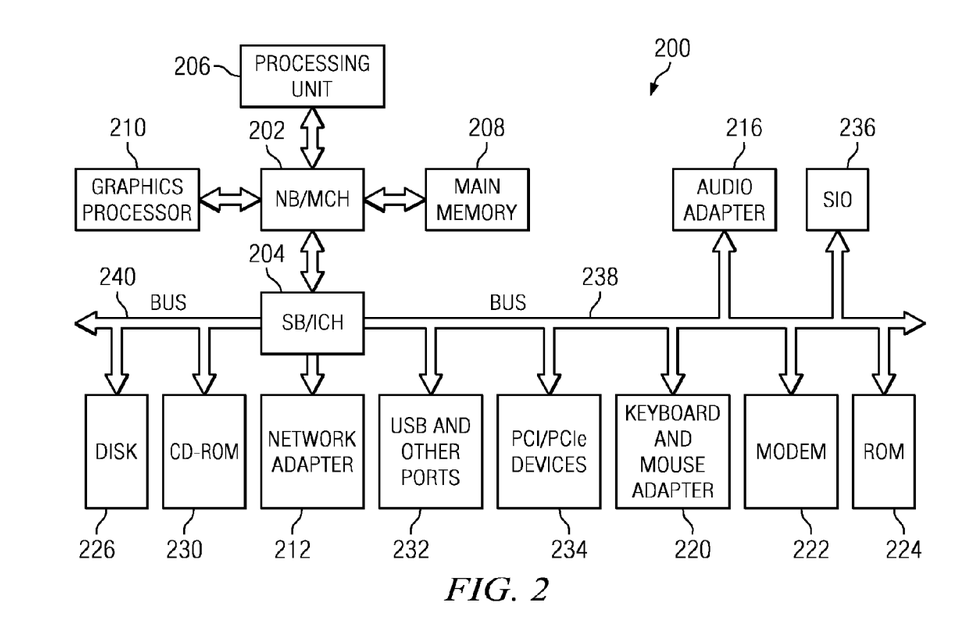
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

In the depicted example, data processing system 200 employs a hub architecture including bridge and memory controller hub (NB/MCH) 202 and bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the disclosure may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

A Services Oriented Architecture (SOA) is an application framework (a set of applications, processes, data, and so forth) that uses hardware and software components such as shown in FIGS. 1 and 2. The data processing system illustrated and described also implements Web services, which is a collection of Web-based enabling technologies. Using Web services-enabled SOA, an enterprise can define and enable a business process, which is a defined set of interrelated tasks linked to an activity that spans functional boundaries. A Web service is a software system identified by a URI, whose public interface and bindings are defined and described by XML. Its definition can be discovered by other software systems. These systems may then interact with the Web service in a manner prescribed by the Web service definition, using XML-based messages conveyed by Internet protocols.

By way of further background, a Web service is described using a standard, formal XML notion, called its service description. A service description typically conforms to a machine-processable format such as the Web Services Description Language (or WSDL) or, more pertinent to the present disclosure, Business Process Enablement Language for Web Services (BPEL4WS). These languages describe the public interface necessary to interact with the service, including message formats that detail the operations, transport protocols and location. The supported operations and messages are described abstractly and then bound to a concrete network protocol and message format. A client program connecting to a Web service reads the BPEL4WS to determine what functions are available on the server. Computing entities running the Web service communicate with one another using XML-based messaging over a given transport protocol. Messages typically conform to the Simple Object Access Protocol (SOAP) and travel over HTTP (over the public Internet) or other reliable transport mechanisms (such as IBM® MQSeries® technologies and CORBA, for transport over an enterprise intranet). The Web service hides the implementation details of the service, allowing it to be used independently of the hardware or software platform on which it is implemented and also independently of the programming language in which it is written. This allows and encourages Web services-based application to be loosely-coupled, component-oriented, cross-technology implementations. Web services typically fulfill a specific task or a set of tasks. They can be used alone or with other Web services to carry out a complex aggregation or a business transaction. A client program connecting to a Web service reads the BPEL4WS or WSDL to determine what functions are available on the server. With Web services, computing resources are exposed in an implementation neutral manner.

A business process transaction typically involves multiple (one or more) sub-transactions, and each sub-transaction may be executed within a data processing environment, e.g., using the hardware and software resources such as described above. In addition, one or more sub-transactions may be implemented within the context of a loosely-coupled distributed environment, such as a federation. As is well-known in the art, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions that are presented by other entities, and providing some form of translation of the identity of the vouched-for user into one that is understood within the local entity. Federation eases the administrative burden on service providers. A service provider can rely on its trust relationships with respect to the federation as a whole. The service provider does not need to manage authentication information, such as user password information, because it can rely on authentication that is accomplished by a user's authentication home domain or an identity provider. In a typical federated environment, a federated identity management system is provided to establish a foundation in which loosely coupled authentication, user enrollment, user profile management and/or authorization services collaborate across security domains. Federated identity management allows services residing in disparate security domains to securely interoperate and collaborate even though there may be differences in the underlying security mechanisms and operating system platforms at these disparate domains.

A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

Figure 3:
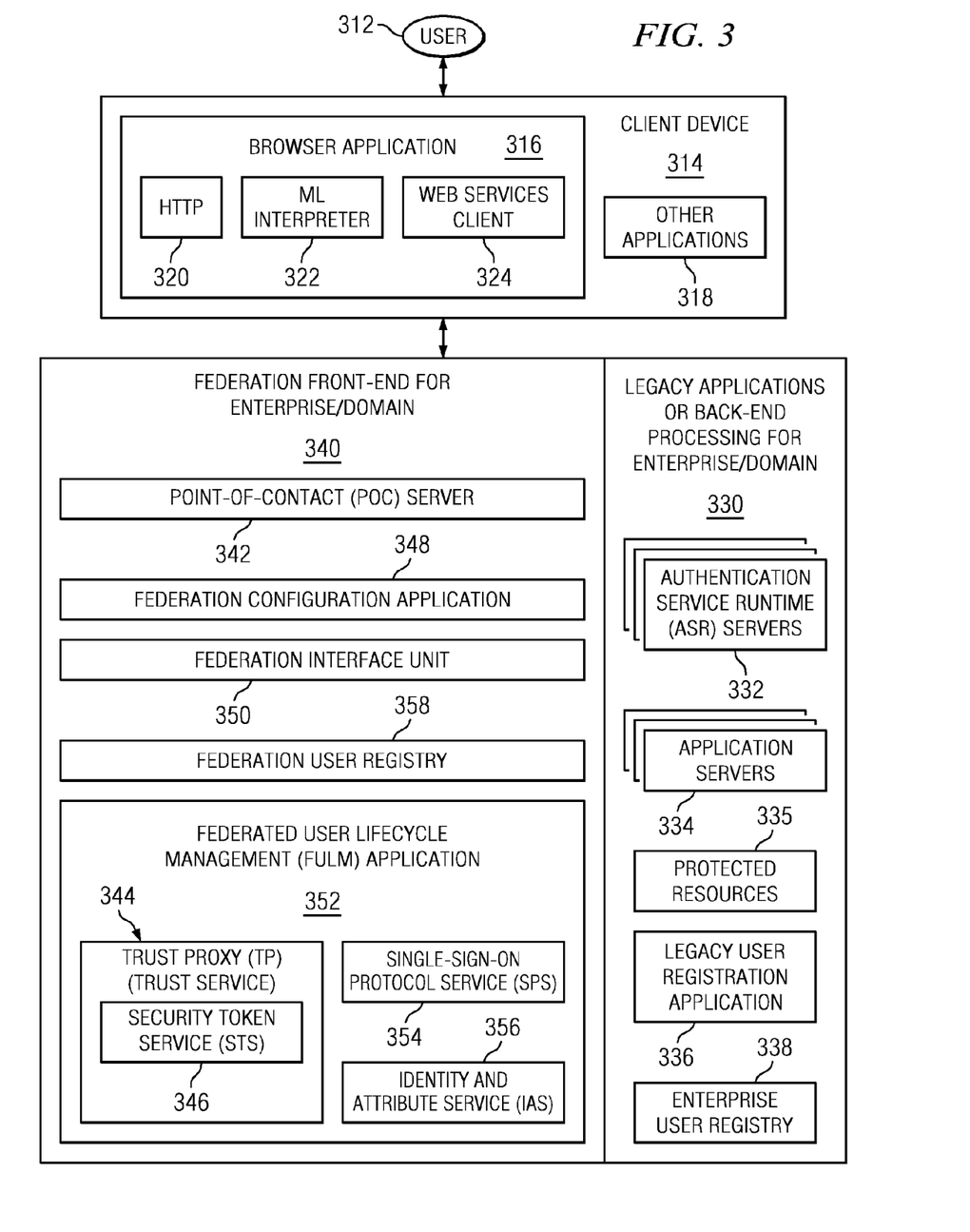
FIG. 3 is an exemplary block diagram of a federated or "loosely-coupled" distributed environment in which the subject disclosure may be implemented.

FIG. 3 is a block diagram that depicts the integration of pre-existing data processing systems (such as those described above) at a given domain with some federated architecture components that may be used to support an embodiment of the present invention. As noted above, a federated environment includes federated entities that provide a variety of services for users. User 312 interacts with client device 314, which may support browser application 316 and various other client applications 318. User 312 is distinct from client device 314, browser 316, or any other software that acts as interface between user and other devices and services. In general, a requester is an intermediary, such as a client-based application, browser, SOAP client, or the like, that may be assumed to act on behalf of the user.

Browser application 316 may be a typical browser, including those found on mobile devices, which application comprises many modules, such as HTTP communication component 320 and markup language (ML) interpreter 322. Browser application 316 may also support plug-ins, such as web services client 324, and/or downloadable applets, which may or may not require a virtual machine runtime environment. Web services client 324 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined data types; and a convention for representing remote procedure calls and responses. User 312 may access web-based services using browser application 316, but user 312 may also access web services through other web service clients on client device 314. Some of the federated operations may employ HTTP redirection via the user's browser to exchange information between entities in a federated environment, although a variety of other communications protocols and techniques may be used. The components that are required for a federated environment can be integrated with pre-existing systems. FIG. 3 depicts one embodiment for implementing these components as a front-end to a pre-existing system, although other approaches may be used. The pre-existing components at a federated domain can be considered as legacy applications or back-end processing components 330, which include authentication service runtime (ASR) servers 332. ASR servers 332 are responsible for authenticating users when the domain controls access to application servers 334, which can be considered to generate, retrieve, or otherwise support or process protected resources 335. The domain may continue to use legacy user registration application 336 to register users for access to application servers 334. Information that is needed to authenticate a registered user with respect to legacy operations is stored in enterprise user registry 338; enterprise user registry 338 may be accessible to federation components as well.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federation front-end processing 340, which includes point-of-contact server 342 and trust proxy server 344 (or more simply, trust proxy 344 or trust service 344) which itself interacts with Security Token Service (STS) 346. Federation configuration application 348 allows an administrative user to configure the federation front-end components to allow them to interface with the legacy back-end components through federation interface unit 350. Federated functionality may be implemented in distinct system components or modules. Most of the functionality for performing federation operations may be implemented by a collection of logical components within a single federation application; thus, for example, federated user lifecycle management application 352 includes trust service 344 along with single-sign-on protocol service (SPS) 354. Trust service 344 may comprise identity-and-attribute service (IAS) 356, which is responsible for identity mapping operations, attribute retrieval, and so forth, as part of federation functionality. Identity-and-attribute service 356 may also be employed by single-sign-on protocol service 354 during single-sign-on operations. A federation user registry 358 may be employed in certain circumstances to maintain user-related information for federation-specific purposes.

Legacy or pre-existing authentication services at a given enterprise may use various, well known, authentication methods or tokens, such as username/password or smart card token-based information. However, in a preferred federated computing system for supporting the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federation front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy such that it appears as if the user was engaged in an authentication dialog.

With the above as background, the techniques of this disclosure can now be described in more detail.

Figure 4:
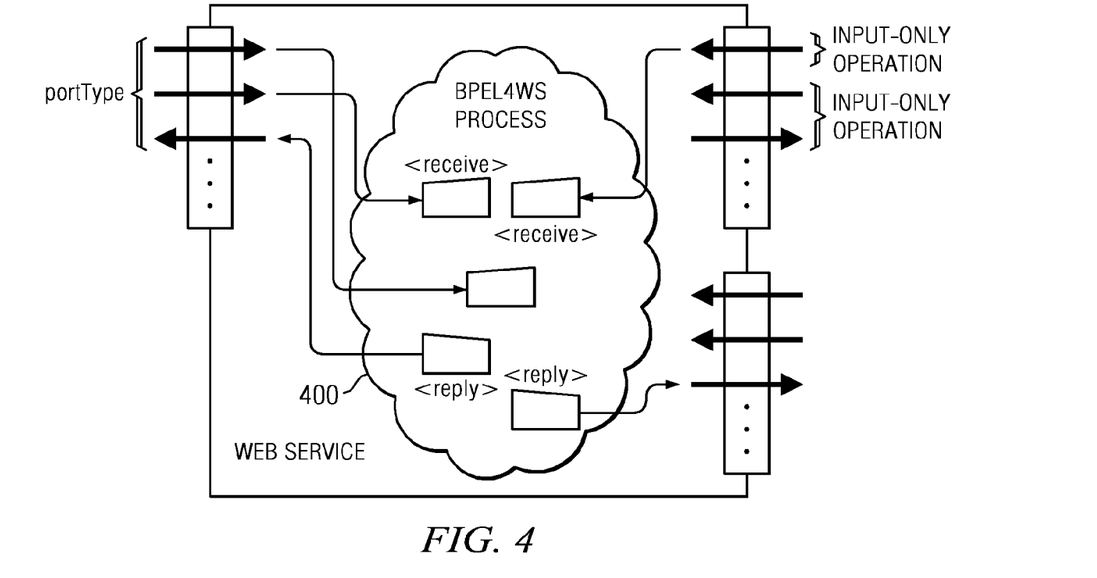
FIG. 4 is a simplified representation of a BPEL process.

As is known in the art, BPEL4WS supports two distinct usage scenarios: implementing executable business processes, and describing non-executable abstract processes. As an executable process implementation language, the role of BPEL4WS is to define a new Web service by composing a set of existing services. Thus, BPEL4WS is basically a language to implement such a composition. The interface of the composite service is described as a collection of WSDL portTypes, just like any other Web service. The composition (called the process) indicates how the service interface fits into the overall execution of the composition. FIG. 4 illustrates this outer view of a BPEL4WS process 400. The composition primitives found in BPEL4WS come primarily from many years of experience in workflow and business process integration, hence its positioning as a business process composition language. Unlike a traditional programming language implementation of a WSDL service, each operation of each portType does not map to a separate piece of logic in BPEL4WS. Instead, the entire type of the service (i.e., the set of portTypes of the service) is implemented by one single BPEL4WS process. Thus, specific "entry-points" corresponding to external users invoking the operations of the interface are indicated within the BPEL4WS description. These entry points consume WSDL operations incoming messages from input-only or input-output operations. In the latter case, the process must also indicate where the output message is generated. BPEL4WS only uses and supports input-only and input-output (request-response) operations of WSDL; output-only (notification) and output-input (solicit-response) operations are not required nor supported.

The BPEL4WS process itself is basically a flowchart like expression of an algorithm. Each step in the process is called an activity. There are a collection of primitive activities: invoking an operation on some Web service (<invoke>), waiting for a message to operation of the service's interface to be invoked by someone externally (<receive>), generating the response of an input/output operation (<reply>), waiting for some time (<wait>), copying data from one place to another (<assign>), indicating that something went wrong (<throw>), terminating the entire service instance (<terminate>), or doing nothing (<empty>). These primitive activities can be combined into more complex algorithms using any of the structure activities provided in the language. These are the ability to define an ordered sequence of steps (<sequence>), the ability to have branching using the now common "case-statement" approach (<switch>), the ability to define a loop (<while>), the ability to execute one of several alternative paths (<pick>), and finally the ability to indicate that a collection of steps should be executed in parallel (<flow>). Within activities executing in parallel, one can indicate execution order constraints by using the links. In addition, BPEL4WS allows one to recursively combine the structured activities to express arbitrarily complex algorithms that represent the implementation of the service.

As a language for composing together a set of services into a new service, BPEL4WS processes mainly consist of making invocations to other services and/or receiving invocations from clients (the users of the service). Invocations are done using the <invoke> activity and the latter using the <receive> and <reply> activities such as shown in FIG. 4. BPEL4WS calls these other services that interact with a process partner. Thus, a partner is either a service the process invokes (invoked partners) as an integral part of its algorithm, or those that invoke the process (client partners). The <invoke> activity indicates the partner to invoke and what operation of which of the partner's portTypes to invoke on that partner.

A service offered by the process may be used (wholly on in parts) by more than one client. In addition, the process may wish to distinguish between these different users of the service. For example, a process representing a loan servicing system offers a single Web service, but only parts of it are accessible to the customer applying for the loan, other parts for the customer service representative and finally the entire service to the loan underwriters. Depending on whether an operation is invoked by the customer or by the underwriter, the returned behavior may be quite different. Furthermore, the approach of using partners to model clients allows the process to indicate that certain operations may only be invoked by certain clients.

BPEL4WS uses service link types to define partners. Basically, a partner is defined by giving it a name and then indicating the name of a service link type and identifying the role that the process will play from that service link type and the role that the partner will play. At runtime, the partner must resolve to an actual Web service. Thus, a partner is really eventually just a typed service reference, where the typing comes from the service link type and the roles. The BPEL4WS process itself does not indicate how a partner is bound to a specific service; that is considered a deployment time or runtime binding step that must be supported by the BPEL4WS implementation.

Web services implemented as BPEL4WS processes have an instanced life cycle model. That is, a client of these services always interacts with a specific instance of the service (process). Unlike traditional distributed object systems, instances in BPEL4WS are created implicitly when messages arrive for the service.

Figure 5:
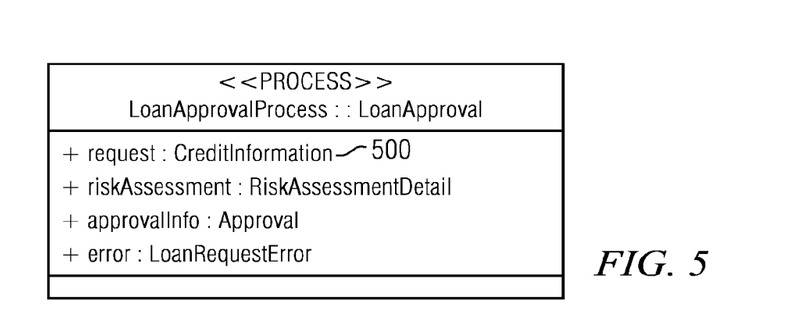
FIG. 5 is a UML-based data model of a business process.
Figure 6:
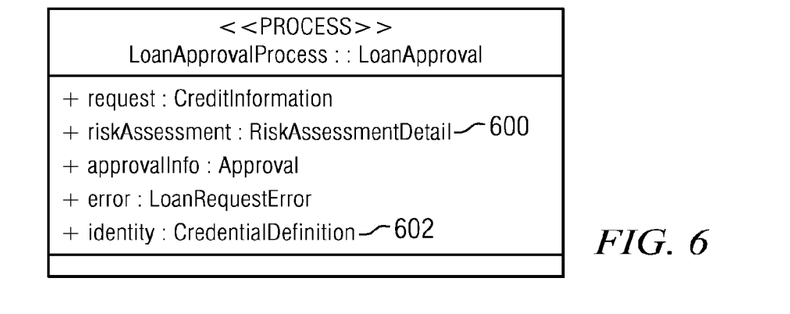
FIG. 6 is an extended UML-based data model of the business process shown in FIG. 5.

FIG. 5 illustrates a UML class 500 used to model a BPEL business process, in this case the loan approval process referenced above. As can be seen, class/model 500 does not include identity information required for this class. One of ordinary skill will appreciate that the "identity information" may be generalized as a "credential." According to the techniques described herein, the class/model 500 is extended (i.e. modified or supplemented) to include identity information, such as shown by extended class/model 600 shown in FIG. 6. In this case, an "identity: CredentialDefinition"—as bound to the class—represents information that is required for this business process. Preferably, however, the identity information is specified generically, i.e. without reference of the particular means of implementation, although this is not a limitation. Thus, for example, assume that the process always requires an identifier; the identity: CredentialDefinition then will indicate that this is the case, however, there need not be any specification (at this level) of the particular characteristics of that identifier, e.g., if the identifier is unique or shared, based on RACF ID or JAAS Subject, asserted or assumed, and so forth. Rather, the extended business process merely includes the generic representation of the identity information required for the class. As will be seen, this identity information is subsequently refined into format-specific identity information, preferably at the time (and at the resource) when a sub-transaction of the business process is to be implemented. This aspect of the subject disclosure is now described in more detail below.

Figure 7:
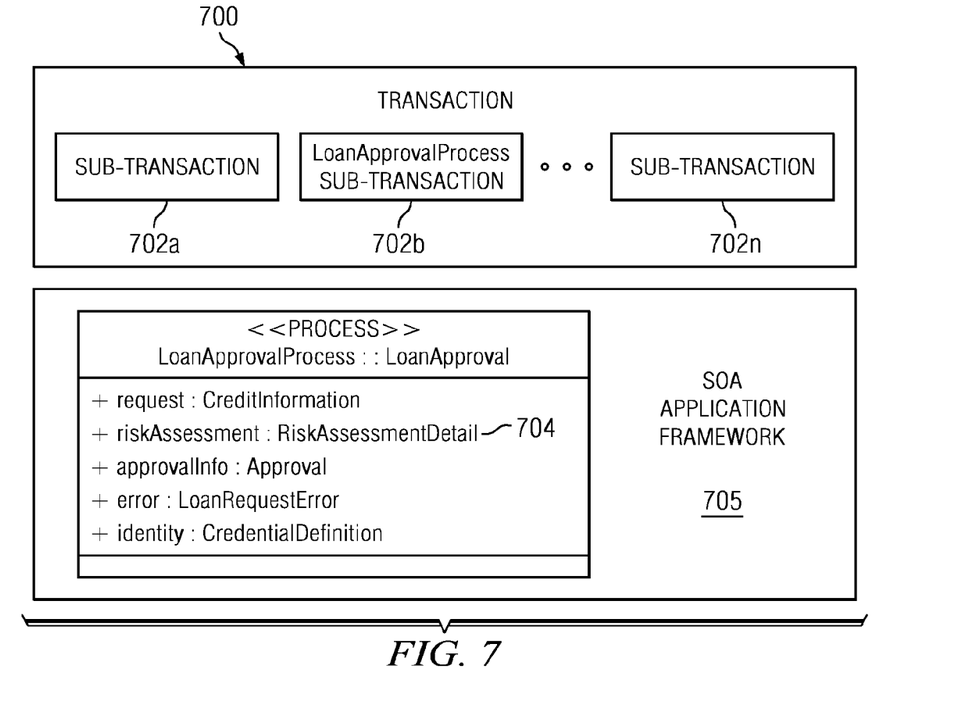
FIG. 7 illustrates the sub-transaction components that comprise a business process transaction.

As seen in FIG. 7, using SOA application framework tools, a given business process transaction 700 is illustrating a comprising a series of sub-transactions 702a-n. For convenience, the sub-transactions are shown in series, but this is not a requirement, as sub-transactions may occur in parallel, or in any desired synchronous or asynchronous combination. One or more of the sub-transactions 702 has a business process model 704 associated therewith, such as the model illustrated in FIG. 6. As noted above, this business process model 704 has been extended or augmented to include generic credential (identity) information that would not otherwise be specified in the model. As the business process is carried out, it is desired that given identity information in a specified format be acted upon within the context of the sub-transaction and, further, that processing of the identity information in such format be carried out using the specific application (or other resources) that are implementing the sub-transaction. To this end, according to the techniques herein, during the transaction the identity information in the business process model 704 is refined into a format that can be acted upon by an application being invoked to perform the sub-transaction (or some aspect thereof). To determine the specified format, the system uses information about the specific platforms on which the sub-transaction is being executed, together with the generic identity information specified in the BPEL4WS, to invoke local tooling that will define the identity/attribute transformation required to complete the sub-transaction. As illustrated in FIG. 7, the business process 700 is being implemented on a SOA application framework 705, which may include systems, applications, services, resources, etc. located within an enterprise or across loosely-coupled distributed environments. A representative distributed environment also may include a cloud environment.

Figure 8:
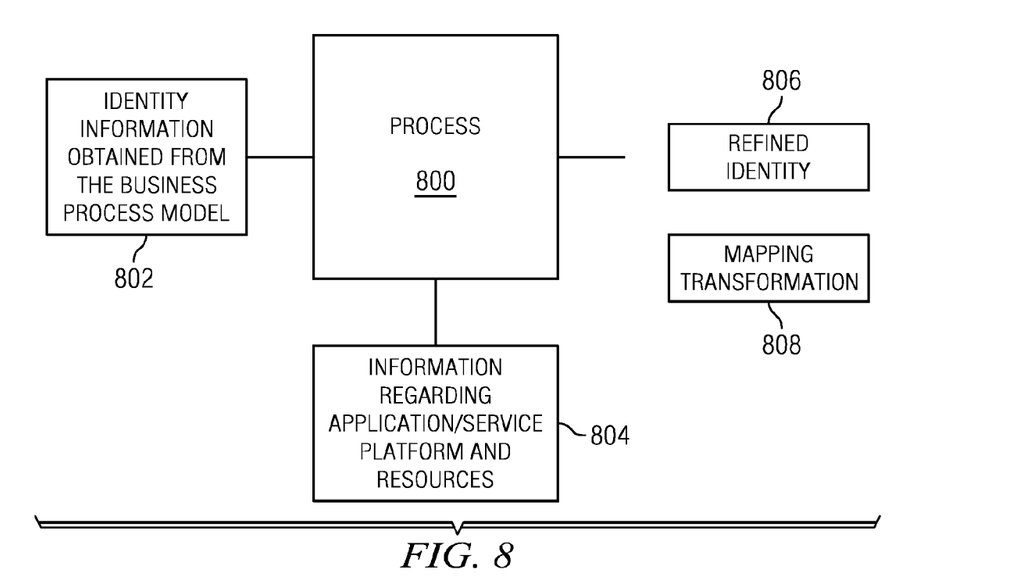
FIG. 8 illustrates how business process identity information is refined into a specific format for use to configure identity mapping functionality during a business process.

FIG. 8 is a block diagram illustrating this basic transformation process. As illustrated, a process 800 takes as inputs: the identity information 802 specified in the extended business process model, together with the information 804 about the local application environment (which information may be obtained from a database, through an API, or other conventional means). An output 806 of the process is a refined specification of an identity (including attributes) that is specific to the local application environment, together with a local identity mapping transformation (i.e. the rules governing the transformation) 808. This tooling can then be applied in the local application environment to manage the identity at this point in a sub-transaction. Thus, for example, if sub-transaction requires access to an IMS resource, the process 800 can be used to refine an identifier to a RACF ID when the local application is an IMS-hosted application.

Figure 9:
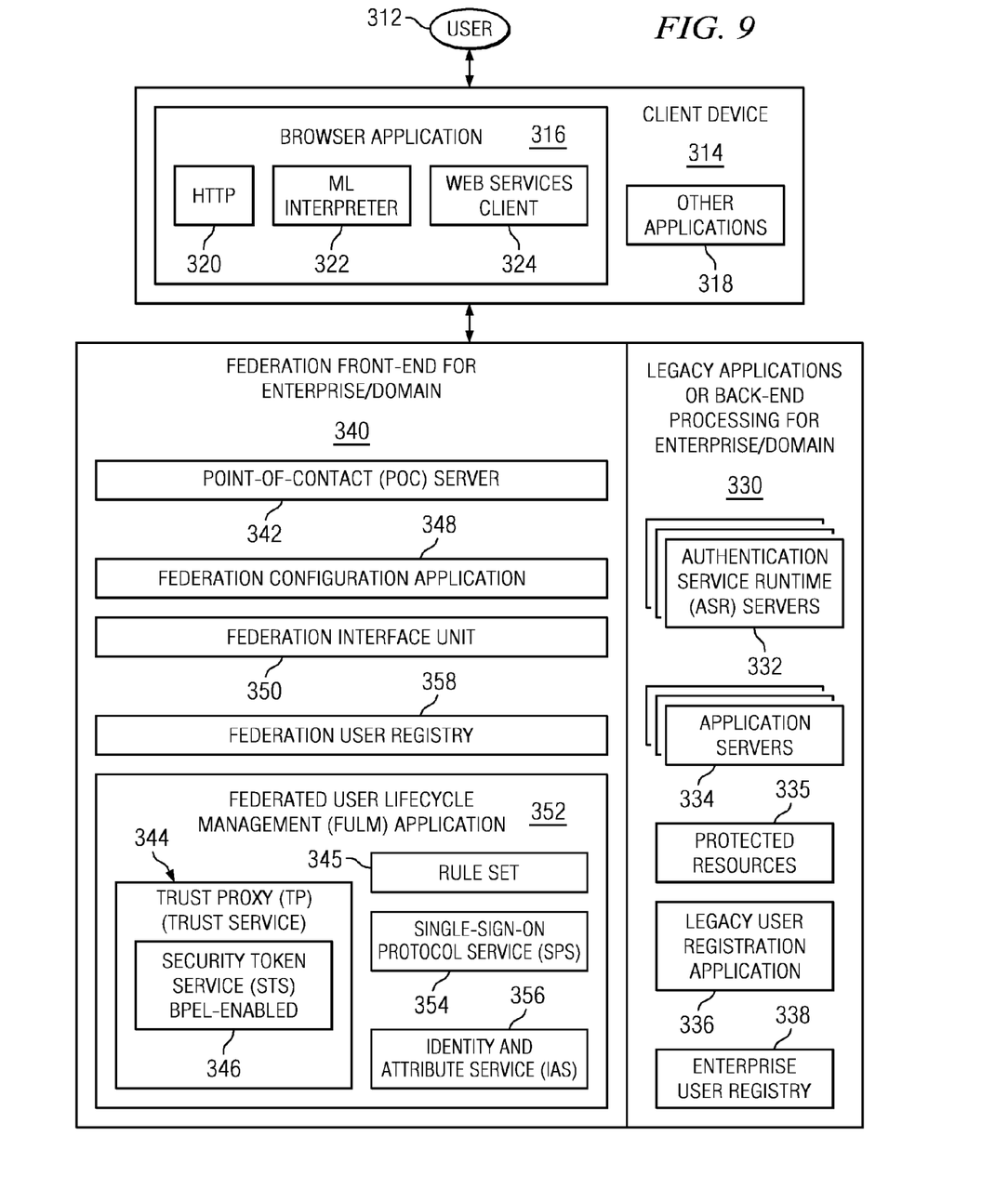
FIG. 9 illustrates how the federated environment shown in FIG. 3 may be adapted to facilitate business process enablement according to the teachings herein.

The process 800 can be implemented in various ways. With reference now to FIG. 9, one convenient representation is shown. This drawing is similar to that shown in FIG. 3 except that the federated user lifecycle management (FULM) application has been extended to include BPEL Rule Set 345. The functionality of process 800 in FIG. 8 generally is implemented by the Security Token Services (STS) 346, which may be instantiated in a commercial product such as Tivoli® Federated Identity Manager (TFIM). In general, BPEL tooling invokes the STS 346 through the federation interface unit 350. Together with the Rule Set 345, STS 346 pulls information it needs to process a BPEL-related request from various sources, such as the identity and attribute service 356, the enterprise user registry 338, and the legacy user registration application 336. Thus, the FULM application is extended to enable BPEL processing, and this operation facilitates a loose coupling of identity information with BPEL.

When the business process is deployed, the above-described techniques enable tooling to be invoked, which tooling in turn is used to determine the services/applications invoked to implement the process and then to determine the identity propagation required to support the business process. In an illustrated embodiment, the Security Token Service (STS) 346 shown in FIG. 9 is used for this purpose. The STS creates the mapping required to map an identifier (including attributes) into the format required at each service/application invoked as part of the process fulfillment. For example, the tooling might indicate that one of the services was IMS-based, thereby invoking additional tooling to generate the appropriate mapping to transform a local identifier into an RACF identifier. The Rule Set 345 may be used to configure identity mapping functionality in a STS tool such as Tivoli® Federated Identity Manager (TFIM), where TFIM is deployed for credential transformation. The Rule Set comprises a set of policies or rules that define how each different business process is invoked and, for each such business process, the identity attribute and credential requirements of the individual services that comprise each such process.

By leveraging a BPEL-like process as part of the generation of the overall transaction flow required to fulfill a BPEL-defined process, one can determine a list of requirements of how identities are transformed through the process. This aids in the definition of the transformation rules that may be required as a user participates in a business process.

The above-described approach allows for the easy identification of the attributes that are available at the "edge" of a process, and this is especially advantageous in the context of a federated environment, as it allows easy determination of the attributes that are available to send as part of a federated request/required to fulfill a request and issue a response. This information (the "available" and "required" lists of attributes/identifiers) can be easily imported into a tool that provides the ability to graphically map the lists of attributes and generate a transformation rule (e.g., if XML formatted lists of data are used, generate an XSLT stylesheet, etc.) that can then be imported into federated identity management points during the identity transformation process.

As noted, the disclosed technique takes the identity (and attribute) requirements from one or more (or each) steps in a BPEL process, and together with information about the specific platforms on which these individual processes are executed, allows the use of the STS (or other identity management functionality) to define the identity/attribute transformation required to complete the transaction.

The subject disclosure provides many advantages. The techniques provide a means of transforming a user's identity (or, more generally, a credential) as part of the enablement of transaction fulfillment within a SOA environment. The techniques herein also facilitate cloud-based applications.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, lectromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

As noted, the techniques described herein may be implemented in or in conjunction with various server-side architectures including simple n-tier architectures, web portals, federated systems, and the like.

The techniques described herein may be implemented as a service, or as a standalone machine.

Having described our invention, what we now claim is as follows:

1. A method for business process automation, comprising:
providing a business process model that includes credential information, wherein the business process model represents a sub-transaction in a transaction and the credential information is specified within the business process model explicitly and without reference to an application framework in which the sub-transaction is to be carried out, the credential information being an identity having at least one attribute associated therewith;
during the transaction as implemented within the application framework, and as the business process model is mapped to a given local execution environment, refining, in a machine having a hardware element, the credential information into a format that can be acted upon by an application in the application framework to be invoked to perform the sub-transaction; and
using the refined credential information in the application framework to perform the sub-transaction.

2. The method as described in claim 1 wherein the business process model is a Business Process Execution Language (BPEL) model.

3. The method as described in claim 2 wherein the business process model is specified by Business Process Execution Language for Web Services (BPEL4WS).

4. The method as described in claim 1 wherein the application framework is a Service Oriented Architecture (SOA) framework.

5. The method as described in claim 1 wherein the application is invoked as a Web service.

6. The method as described in claim 1 wherein the step of refining the credential information retrieves credential requirements for the sub-transaction and binds the credential requirements to an object associated with the sub-transaction.

7. An apparatus, comprising:
a hardware processor;
computer memory holding computer program instructions executed by the hardware processor, the computer program instructions comprising:
program code for providing a business process model that includes credential information, wherein the business process model represents a sub-transaction in a transaction and the credential information is specified within the business process model explicitly and without reference to an application framework in which the sub-transaction is to be carried out, the credential information being an identity having at least one attribute associated therewith;
program code executable during the transaction as implemented within the application framework, and as the business process model is mapped to a given local execution environment, for refining the credential information into a format that can be acted upon by an application in the application framework to be invoked to perform the sub-transaction; and
program code for using the refined credential information in the application framework to perform the sub-transaction.

8. The apparatus as described in claim 7 wherein the business process model is a Business Process Execution Language (BPEL) model.

9. The apparatus as described in claim 8 wherein the business process model is specified by Business Process Execution Language for Web Services (BPEL4WS).

10. The apparatus as described claim 7 wherein the application framework is a Service Oriented Architecture (SOA) framework.

11. The apparatus as described in claim 7 wherein the application is invoked as a Web service.

12. The apparatus as described in claim 7 wherein the program code executable for refining the credential information retrieves credential requirements for the sub-transaction and binds the credential requirements to an object associated with the sub-transaction.

13. A computer program product in a non-transitory computer readable medium for use in a data processing system for business process automation, the computer program product holding computer program instructions executed by the data processing system, the computer program instructions comprising:
program code providing a business process model that includes credential information, wherein the business process model represents a sub-transaction in a transaction and the credential information is specified within the business process model explicitly and without reference to an application framework in which the sub-transaction is to be carried out, the credential information being an identity having at least one attribute associated therewith;
program code executable during the transaction as implemented within the application framework, and as the business process model is mapped to a given local execution environment, for refining the credential information into a format that can be acted upon by an application in the application framework to be invoked to perform the sub-transaction; and
program code using the refined credential information in the application framework to perform the sub-transaction.

14. The computer program product as described in claim 13 wherein the business process model is a Business Process Execution Language (BPEL) model.

15. The computer program product as described in claim 14 wherein the business process model is specified by Business Process Execution Language for Web Services (BPEL4WS).

16. The computer program product as described in claim 13 wherein the application framework is a Service Oriented Architecture (SOA) framework.

17. The computer program product as described in claim 13 wherein the application is invoked as a Web service.

18. The computer program product as described in claim 13 wherein the program code refining the credential information retrieves credential requirements for the sub-transaction and binds the credential requirements to an object associated with the sub-transaction.

* * * * *